United States Patent [19]
Kodaka

[11] Patent Number: 5,754,907
[45] Date of Patent: May 19, 1998

[54] DIAPHRAGM MOVEMENT DEVICE

[75] Inventor: Yoshiro Kodaka, Kanagawa, Japan

[73] Assignee: Nikon Corporation, Tokyo, Japan

[21] Appl. No.: 530,431

[22] Filed: Sep. 19, 1995

[30] Foreign Application Priority Data

Feb. 10, 1995 [JP] Japan .................. 7-022834

[51] Int. Cl.$^6$ .................................. G03B 9/02
[52] U.S. Cl. .................. 396/79; 396/505; 359/740
[58] Field of Search .................. 354/195.12, 228–233, 354/270, 271.1, 272, 273, 274; 359/739, 740, 802–826; 396/72, 79, 83, 505, 508, 510

[56] References Cited

U.S. PATENT DOCUMENTS 4,525,037  6/1985  Metabi .................. 359/740

*Primary Examiner*—Howard B. Blankenship
*Attorney, Agent, or Firm*—Oliff & Berridge

[57] ABSTRACT

A diaphragm movement device that moves a diaphragm mechanism with movement of a lens group to improve optical performance is disclosed. The diaphragm movement device includes a first lens group, a second lens group that is movable in the direction of the optical axis with the respect to the first lens group for focus and/or focal length adjustment, a diaphragm mechanism including a diaphragm blade holding ring, a diaphragm driving plate, and a diaphragm blade between the first lens group and the second lens group, and a diaphragm movement component having a protrusion and a sloped surface. An applied force member moves the diaphragm mechanism in the direction of the optical axis by a fixed amount corresponding to the movement of the second lens group in the direction of the optical axis.

20 Claims, 5 Drawing Sheets

1

DIAPHRAGM MOVEMENT DEVICE

BACKGROUND OF THE INVENTION

1. Field of the Invention

The present invention relates to a diaphragm movement device with a capability of moving a diaphragm mechanism correspondingly to the movement of a lens group in a focusing operation, focal length adjustment operation, and the like.

2. Background of Related Art

A conventional lens barrel is known with a plurality of lens groups inside, wherein a diaphragm device that adjusts the diaphragm between the fixed lens groups is provided. With this type of lens barrel, the diaphragm mechanism is fixed at a specified position in the lens barrel.

With such a conventional lens barrel, for example, one wherein the diaphragm mechanism is between a fixed lens group and a focusing lens group, the distance between the fixed lens group and the diaphragm mechanism remains constant. On the other hand, the distance between the focusing lens group that is moved in the direction of the optical axis and the diaphragm mechanism at the time of focusing and the like varies according to the movement of the focusing lens group in the direction of the optical axis. Because of this, there are problems resulting from the amount of the movement of the focusing lens causing the position of the diaphragm mechanism to not be optimally positioned along the optical axis relative to the fixed lens group and the focusing lens group, and thus decreasing optical performance (vignetting).

SUMMARY OF THE INVENTION

An objective of the present invention is to solve the problems described previously and to place the diaphragm mechanism at an optimum position, regardless of the position of the movable lens group, for achieving good optical performance.

To accomplish this objective, the present invention includes a first lens group, a second lens group movable in the direction of the optical axis relative to the first lens group to adjust the focus and/or the focal length, a diaphragm mechanism between the first lens group and the second lens group, and a diaphragm movement component that moves the diaphragm mechanism in the direction of the optical axis by a fixed amount corresponding to the movement of the second lens group in the direction of the optical axis.

The diaphragm movement device according to the present invention may include a diaphragm movement component including a cam ring that moves the second lens group in the direction of the optical axis by engaging with the second lens group that then rotates around the optical axis, and a connecting member that connects the cam ring and the diaphragm mechanism so that the diaphragm mechanism is moved in the direction of the optical axis with the rotation of the cam ring around the optical axis.

The diaphragm moving system according to the present invention may include a diaphragm movement component including an attached member connected to the second lens group that makes contact with or is separated from the diaphragm device that moves in the direction of the optical axis based on the contact state with the attached member.

With the present invention, the diaphragm movement component may move the diaphragm mechanism corresponding to the amount of movement of the second lens group. Therefore, the diaphragm mechanism can be placed at a position for good optical performance regardless of the movement by the second lens group to any position.

With the present invention, the diaphragm movement component may move the diaphragm mechanism based on the amount of rotation of the cam ring. Thus, the amount of movement by the diaphragm mechanism can be controlled easily.

In one embodiment of the present invention, the diaphragm movement component may move the diaphragm mechanism only when the second lens group goes beyond a specified position to cause movement of the diaphragm mechanism.

BRIEF DESCRIPTION OF THE DRAWINGS

The invention will be described with reference to the following drawings in which like reference numerals refer to like elements and wherein.

DETAILED DESCRIPTION OF PREFERRED EMBODIMENTS

Figure 1:
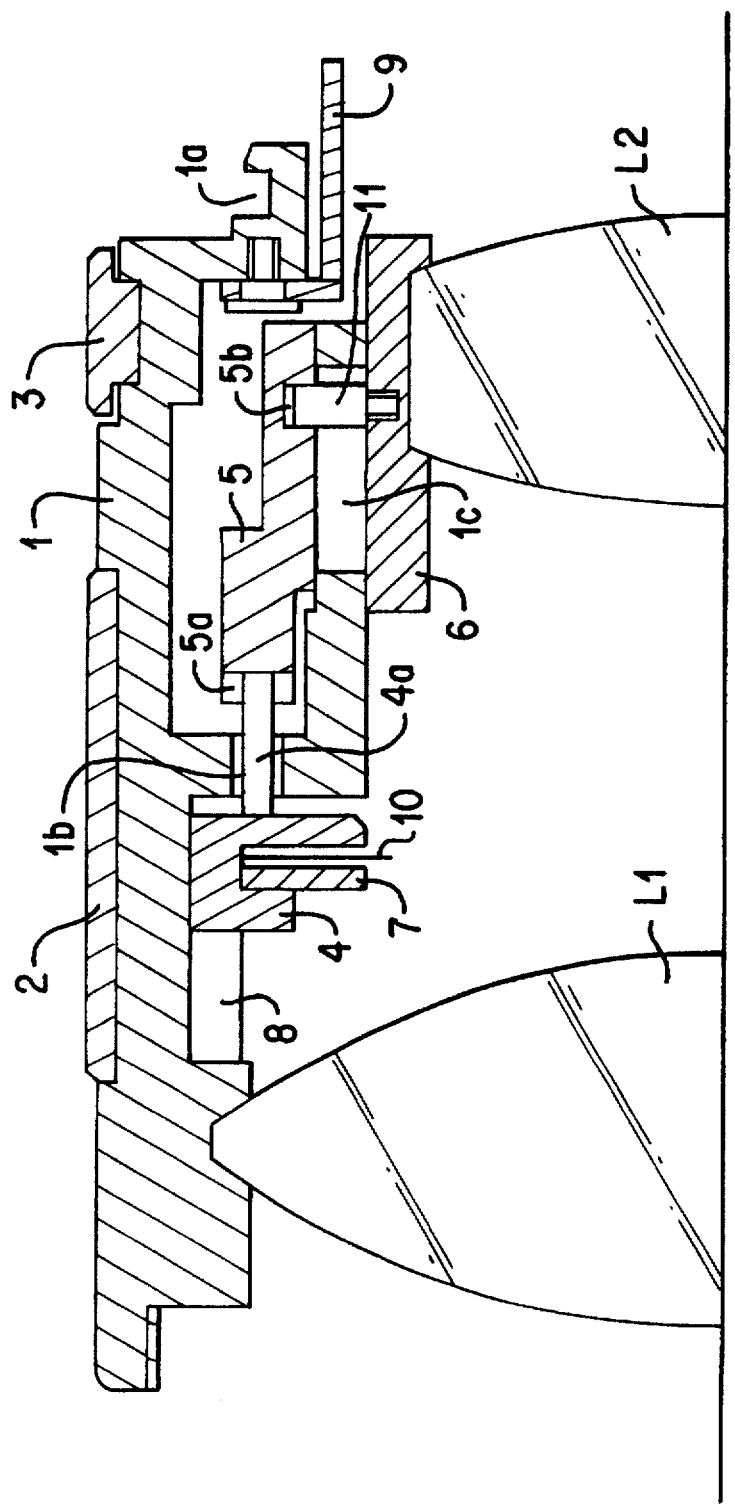
FIG. 1 is a cross-sectional view showing the interior structure of a first embodiment of the lens barrel with a diaphragm movement device according to the present invention.
Figure 2A:
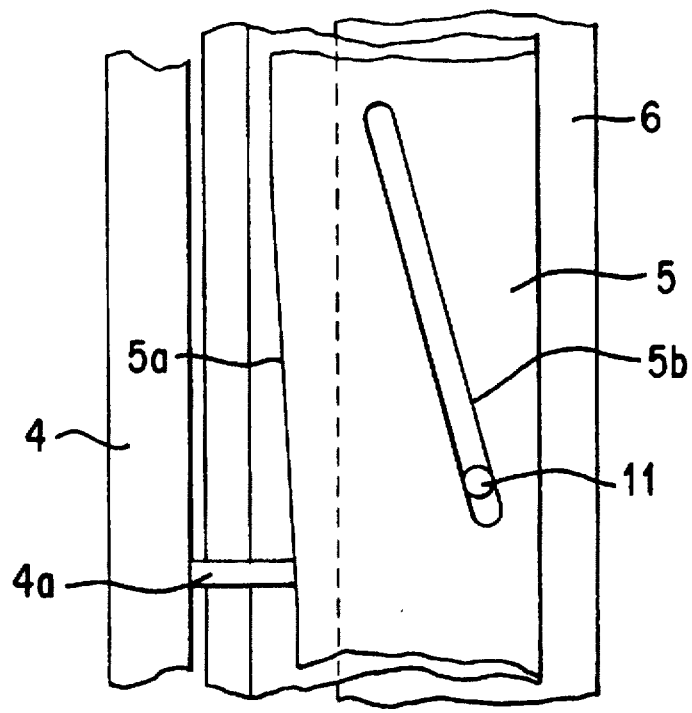
FIGS. 2(a) and 2(b) are plane expanded views of a cam ring and its cam groove, a sliding ring, and a diaphragm blade holding ring of the lens barrel of FIG. 1 at a far focus position and at a near focus position respectively.
Figure 2B:
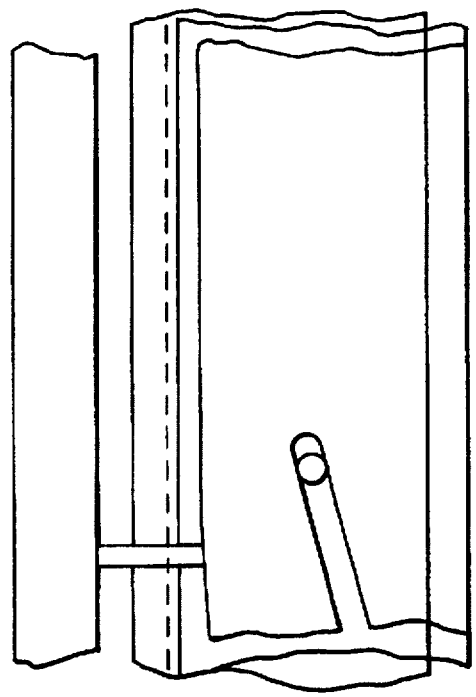

Embodiments of the present invention are described hereafter with reference to FIGS. 1–5. FIG. 1 is a cross-sectional view showing the interior structure of a first embodiment of the lens barrel including a diaphragm movement device according to the present invention. FIGS. 2(a) and 2(b) are plane expanded views of the lens barrel of FIG. 1, showing a cam ring 5 and a cam groove 5b, a sliding ring 6, and a diaphragm blade holding ring 4 at a far focus position and at a near focus position, respectively.

In FIG. 1, the lens barrel includes a fixed cylinder 1 that holds a first lens group L1 at an object end and a mount 1a that extends at the rear end of the fixed cylinder 1 for installing the lens barrel onto a camera body.

A distance control ring 2 for focusing is rotatable around the optical axis, on the outside of the fixed cylinder 1. A diaphragm adjustment ring 3 for adjusting the diaphragm is rotatable around the optical axis on the outside of the fixed cylinder 1. The cam ring 5 is placed within the fixed cylinder 1, engaged with the distance control ring 2 (engagement not shown in the Figures), and is rotated by the rotation of the distance control ring 2 around the optical axis. A sloped surface 5a is constructed at the front edge of the cam ring 5. A cam groove 5b is constructed on the interior side of the cam ring 5 along a specified direction.

A sliding ring 6 holds the second lens group L2 that adjusts the focus and/or the focal length by moving the second lens group L2 in the direction of the optical axis. On the peripheral surface of the sliding ring 6, a pin 11 is engaged with the cam groove 5b of the cam ring 5. In addition, a small diameter inner component of the fixed cylinder 1 is between the cam ring 5 and the sliding ring 6, on which a linear groove 1c is constructed along the direction of the optical axis. Therefore, the sliding ring 6 is moved in the direction of the optical axis by the rotation of the cam ring 5 around the optical axis.

The diaphragm blade holding ring 4 is engaged inside the fixed cylinder 1, wherein a diaphragm driving plate 7 and a diaphragm blade 10 are placed. The diaphragm driving plate 7 is rotated by a driving force from the camera body for stopping down the diaphragm blade 10. A diaphragm drive transferring plate 9 transfers the driving force from the camera body side to the diaphragm driving plate 7.

A protrusion 4a is included lengthwise on the diaphragm blade holding ring 4 toward the cam ring 5, engaging with the sloped surface 5a on the cam ring 5 through a hole 1b on the fixed cylinder 1. An applied force member 8 applies force to the diaphragm blade holding ring 4 toward the cam ring 5 so that the protrusion 4a and the sloped surface 5a on the cam ring 5 always engage with each other.

Next, the focus operation of this lens barrel is described.

First, when the distance control ring 2 is rotated from the far focus side to the near focus side, the cam ring 5 is rotated around the optical axis. As a result, the sliding ring 6 is moved in the direction of the optical axis toward the first lens group L1 so that the second lens group L2 is also moved toward the first lens group L1 during the focusing action.

In addition, the protrusion 4a is pushed toward the first lens group L1 along the sloped surface 5a due to the rotation of the cam ring 5, and the diaphragm blade holding ring 4 is moved toward the first lens group L1 against the applied force from the applied force member 8. At this time, since the protrusion 4a is engaged with the hole 1b on the fixed cylinder 1, the diaphragm blade holding ring 4 does not rotate. When the distance control ring 2 is rotated from the near focus side to the far focus side, the diaphragm blade holding ring 4 is moved away from the first lens group L1 with the protrusion 4a engaging the sloped surface 5a on the cam ring 5 due to the applied force from the applied force member 8.

From the action described above, corresponding the movement of the second lens group L2 in the direction of the optical axis at the time of focusing, the diaphragm blade 10 is moved in the direction of the optical axis and placed at a position where the optical performance becomes the best.

Figure 3:
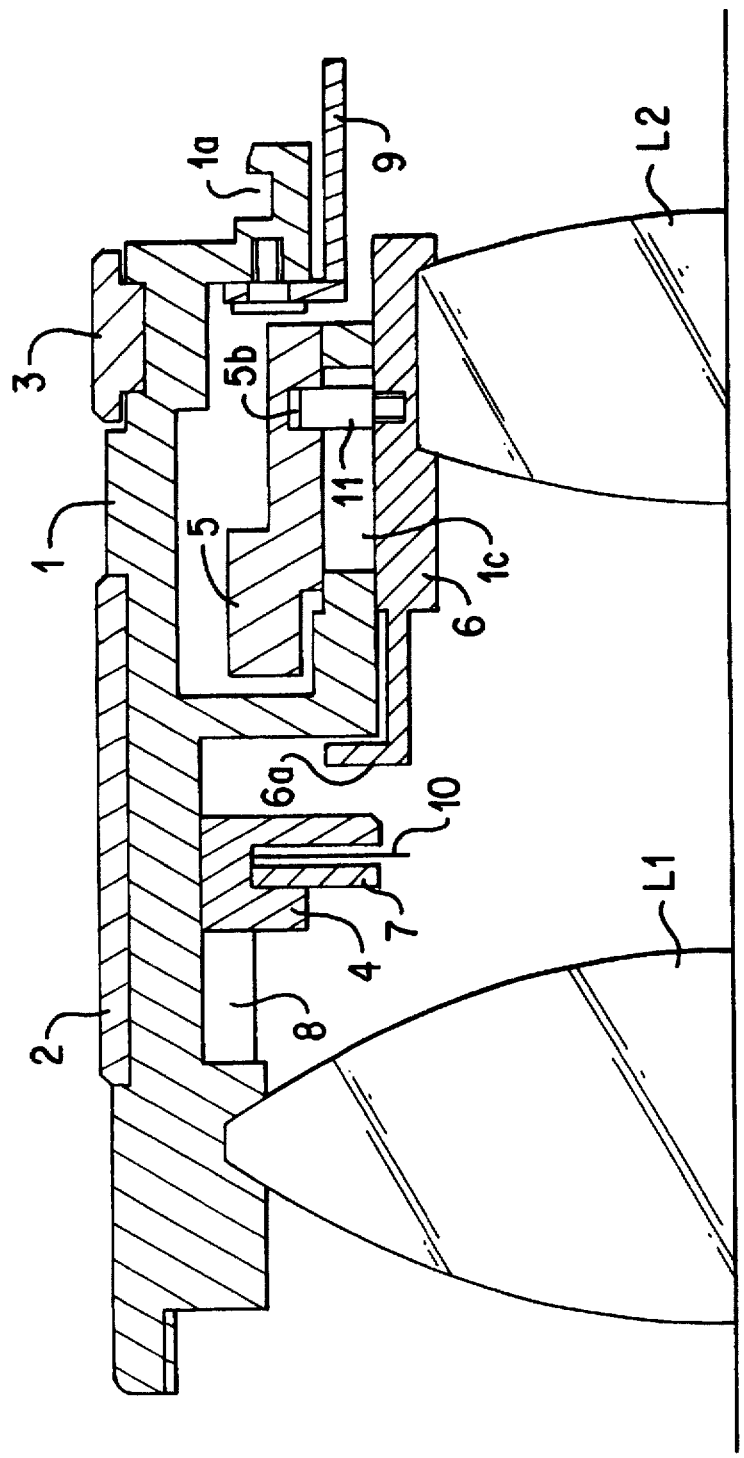
FIG. 3 is a cross-sectional view showing the interior structure of a second embodiment of the lens barrel with a diaphragm movement device according to the present invention.

FIG. 3 is a cross-sectional view that shows the interior structure of a second embodiment of a lens barrel including the diaphragm movement device according to the present invention. In the second embodiment, unlike the first embodiment, the protrusion 4a is not on the outside of the diaphragm blade holding ring 4 and the diaphragm blade holding ring 4 and the cam ring 5 are not engaged. Instead, a protrusion 6a is on the front side of the sliding ring 6.

Figure 4:
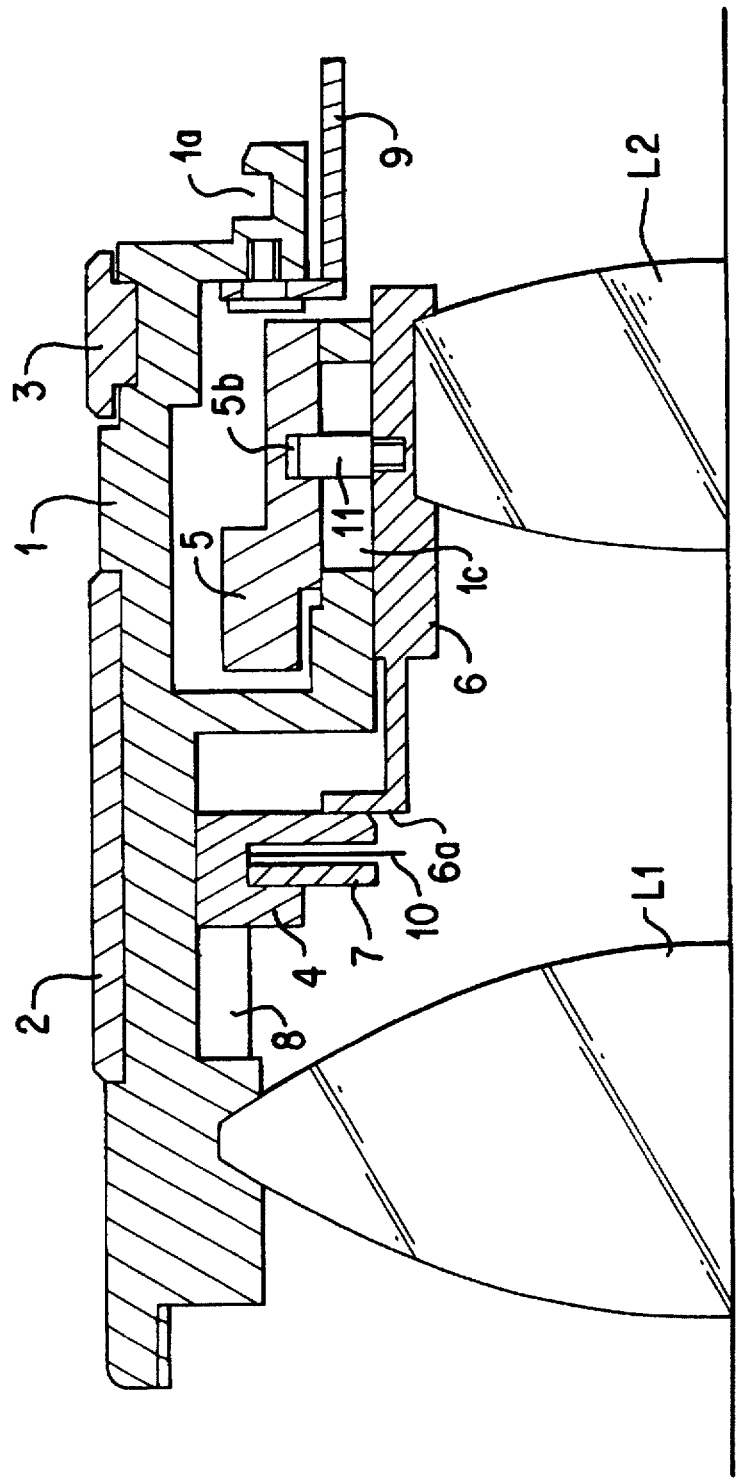
FIG. 4 is a cross-sectional view similar to FIG. 3 but with the distance control ring rotated relative to the state shown in FIG. 3.
Figure 5:
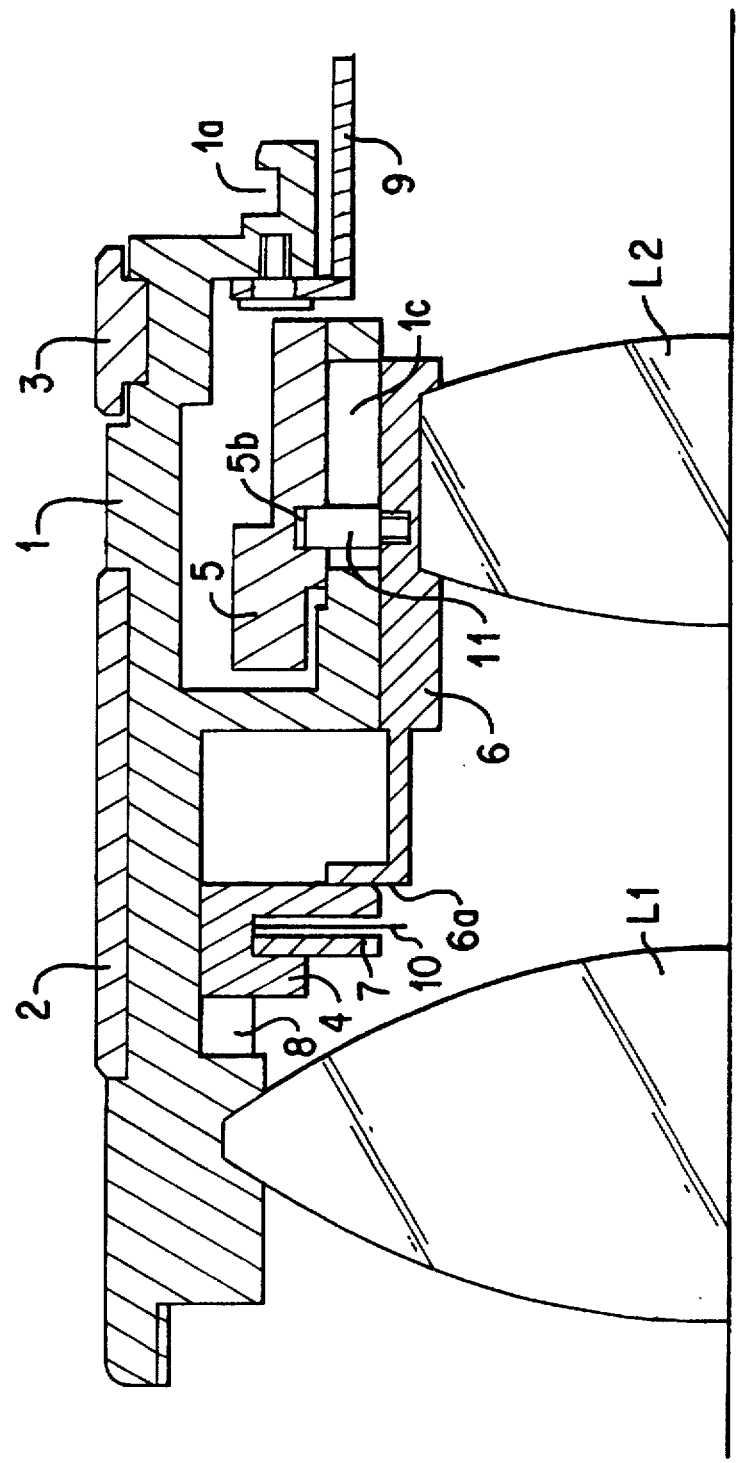
FIG. 5 is a cross-sectional view similar to FIG. 4 but with the distance control ring further rotated from the state shown in FIG. 4.

When the second lens group L2 is at the far focus side, the diaphragm blade holding ring 4 and the protrusion 6a are not engaged. As the distance controlling ring 2 is rotated from that position toward the near focus side, the protrusion 6a approaches the diaphragm blade holding ring 4 due to the movement of the sliding ring 6 toward the first lens group L1. Then when the protrusion reaches an appropriate position, the protrusion engages with the diaphragm blade holding ring 4 (FIG. 4). From this state, if the distance control ring 2 is rotated further to the near focus side, the diaphragm blade holding ring 4 is pushed by the protrusion 6a and moved toward the first lens group L1 against the applied force from the applied force member 8 (FIG. 5).

On the other hand, when the opposite operation is performed, that is, when the distance control ring 2 is rotated from the near focus side to the far focus side, the diaphragm blade holding ring 4 is pushed away from the first lens group L1 with engagement of the protrusion 6a by the applied force from the applied force member 8. After the diaphragm blade holding ring 4 is placed at the proper position, the protrusion 6a disengages from the diaphragm blade holding ring 4.

The present invention is not limited to the embodiments described above. For example, even though the distance control ring 2 was rotated manually in the above embodiments, the present invention may be applied to an autofocus (AF) device with the cam ring 5 rotated by a motor drive.

According to the present invention, the diaphragm mechanism can be placed at the best position for the optical performance regardless of the movement of the second lens group to any position. Moreover, the amount of the movement by the diaphragm mechanism can be controlled easily and the movement of the diaphragm mechanism can be controlled.

As indicated previously, the movement of the second lens group in the direction of the optical axis may be primarily directed to achieving a desired focus or a desired focal length for the combination of lens groups L1 and L2. However, it is noted that the change in the distance between lens groups L1 and L2, even if directed to achieving a desired focus, may cause some change in the focal length of the combination of the two lens groups.

It is evident many additional alternatives, modifications and variations will be apparent to those skilled in the art. Accordingly, preferred embodiments of the invention as set forth herein are intended to be illustrative, not limiting. Various changes may be made without departing from the spirit and scope of the invention as defined in the following claims.

What is claimed is:

1. A diaphragm movement device comprising:
    a first lens group;
    a second lens group movable in the direction of an optical axis;
    a diaphragm mechanism slidably mounted between said first lens group and said second lens group and movable with respect to each lens group in the direction of said optical axis; and
    a diaphragm movement component that moves said diaphragm mechanism in the direction of said optical axis in response to the movement of said second lens group in the direction of said optical axis.

2. The diaphragm movement device of claim 1, wherein said diaphragm movement component comprises a diaphragm movement device comprising:
    a cam ring that is rotatable around said optical axis, wherein said cam ring moves said second lens group in the direction of said optical axis by engagement between said second lens group and said cam ring during rotation of said cam ring around said optical axis; and
    a connecting member that slidably connects said cam ring and said diaphragm mechanism so that said diaphragm mechanism is movable in the direction of said optical axis with rotation of said cam ring around said optical axis.

3. The diaphragm movement device of claim 2, wherein said connecting member comprises a protrusion on said diaphragm mechanism extending in the direction of said optical axis that contacts a sloped surface of said cam ring.

4. The diaphragm movement device of claim 3, wherein said diaphragm mechanism comprises a diaphragm blade holding ring that includes said protrusion.

5. The diaphragm movement device of claim 3, wherein said diaphragm movement component comprises an applied force member that applies a force to said diaphragm mechanism toward contact with said sloped surface of said cam ring.

6. The diaphragm movement device of claim 1, wherein said diaphragm movement component comprises a diaphragm movement device comprising:

an attached component attached to said second lens group that makes contact with said diaphragm mechanism when said second lens group is in a first range of movement along said optical axis and that is separated from said diaphragm mechanism when said second lens group is in a second range of movement along said optical axis.

7. The diaphragm mechanism of claim 6, wherein said first range of movement is located closer to said first lens group along said optical axis than said second range of movement.

8. The diaphragm mechanism of claim 6, further comprising a sliding ring that holds said second lens group, and wherein said attached component comprises a protrusion on said sliding ring extending in the direction of said optical axis that contacts said diaphragm mechanism.

9. A diaphragm movement device, comprising:

a first lens group;

a second lens group movable in the direction of an optical axis;

a diaphragm mechanism slidably mounted between said first lens group and said second lens group and movable with respect to each lens group in the direction of said optical axis; and a diaphragm movement means for moving said diaphragm mechanism in the direction of said optical axis in response to the movement of said second lens group in the direction of said optical axis.

10. The diaphragm movement device of claim 9, wherein said diaphragm movement means comprises cam means rotatable around said optical axis for moving said second lens group in the direction of said optical axis by engagement between said second lens group and said cam means during rotation around said optical axis; and connecting means for connecting said cam means and said diaphragm mechanism so that said diaphragm mechanism is movable in the direction of said optical axis with rotation of said cam means around said optical axis.

11. The diaphragm movement device of claim 10, wherein said connecting means comprises protrusion means on said diaphragm mechanism extending in the direction of said optical axis that contacts a sloped surface of said cam means.

12. The diaphragm movement device of claim 11, wherein said diaphragm mechanism comprises a diaphragm blade holding ring that includes said protrusion means.

13. The diaphragm movement device of claim 11, wherein said diaphragm movement means comprises an applied force means for applying a force to said diaphragm mechanism toward contact with said sloped surface of said cam means.

14. The diaphragm movement device of claim 9, wherein said diaphragm movement means comprises an attached means attached to said second lens group for making contact with said diaphragm mechanism when said second lens group is in a first range of movement along said optical axis and for separating from said diaphragm mechanism when said second lens group is in a second range of movement along said optical axis.

15. The diaphragm mechanism of claim 14, wherein said first range of movement is located closer to said first lens group along said optical axis than said second range of movement.

16. A method of adjusting a diaphragm movement device including a first lens group, a second lens group movable in the direction of an optical axis, and a diaphragm mechanism slidably mounted between said first lens group and said second lens group and movable with respect to each lens group in the direction of said optical axis, comprising the steps of:

moving said second lens group in the direction of said optical axis; and moving said diaphragm mechanism in the direction of said optical axis in response to the movement of said second lens group in the direction of said optical axis such that said diaphragm mechanism is moved with respect to said second lens group and said first lens group.

17. The method of claim 16, wherein said moving steps comprise rotating a cam ring around said optical axis to cause movements of said second lens group and said diaphragm mechanism in the direction of said optical axis.

18. The method of claim 17, further comprising the step of applying a force to said diaphragm mechanism toward contact with a sloped surface of said cam ring.

19. The method of claim 16, further comprising the steps of:

making contact of said diaphragm mechanism with a component attached to said second lens group when said second lens group is in a first range of movement along said optical axis; and separating said diaphragm mechanism from said component attached to said second lens group when said second lens group is in a second range of movement along said optical axis.

20. The method of claim 19, wherein said first range of movement is located closer to said first lens group along said optical axis than said second range of movement.

* * * * *